(12) United States Patent
Chen

(10) Patent No.: US 6,184,950 B1
(45) Date of Patent: Feb. 6, 2001

(54) LUMINOUS STRUCTURE FOR LIQUID CRYSTAL DISPLAYS

(76) Inventor: Chien Liang Chen, No. 7, Lane 2, Sec. 4, Cheng Te Rd., Taipei (TW)

( * ) Notice: Under 35 U.S.C. 154(b), the term of this patent shall be extended for 0 days.

(21) Appl. No.: 09/136,916

(22) Filed: Aug. 20, 1998

(51) Int. Cl.[7] .................................................. G02F 1/1335
(52) U.S. Cl. ................................ 349/68; 362/26; 379/65; 379/71
(58) Field of Search .................................. 349/62, 65, 69, 349/68, 72; 250/462.1; 362/26, 81

(56) References Cited

U.S. PATENT DOCUMENTS

| | | | |
|---|---|---|---|
| 3,950,078 | * | 4/1976 | Zatsky ..................................... 349/71 |
| 4,641,925 | * | 2/1987 | Gasparaitis et al. .................... 349/68 |
| 5,815,228 | * | 9/1998 | Flynn ....................................... 349/71 |
| 5,885,483 | * | 3/1999 | Hao et al. ......................... 252/307.4 R |

FOREIGN PATENT DOCUMENTS

2007900A * 7/1997 (GB).

* cited by examiner

*Primary Examiner*—Kenneth Parker
(74) *Attorney, Agent, or Firm*—Rosenberg, Klein & Lee

(57) ABSTRACT

A LCD luminous structure comprises a LCD liquid crystal displaying plate which is connected with a circuit by a bus, a light guiding plate, a dispersing piece, etc., light emitting diodes or other light sources are installed on the sides of the light guiding plate. Wherein the luminous piece having the function of luminosity is installed on the bottom of the liquid crystal displaying plate. By above structure, the power may be saved and the cell need not be updated frequently.

1 Claim, 4 Drawing Sheets

LUMINOUS STRUCTURE FOR LIQUID CRYSTAL DISPLAYS

BACKGROUND OF THE INVENTION

The present invention relates to a LCD luminous structure, by which more power can be saved, and cells will not been updated frequently.

LCDs (liquid crystal display) have been widely used in a pager, a wireless phone, and other products. In general, if it is used at night, a light emitting diode or other light source is necessary so that the displaying message may be clearly seen by a user. However, light emitting diodes or other light sources consume much power. If it is used frequently, the power will be wasted. Thus the prior art LCD has some defects necessary to be improved.

SUMMARY OF THE INVENTION

Accordingly, the object of the present invention is to provide a LCD luminous structure, wherein a luminous piece is installed on the bottom of a LCD liquid crystal displaying plate. This luminous piece can absorb light as it is illuminated by sunlight or bulb light, and can radiate light as it is at night or in dark environment of insufficient illumination. Therefore, in the night or other environments with bad illumination, the display message on the liquid crystal displaying plate can be clearing seen by users. Since the installation of the luminous piece may provide another selection for the user, thus the power consumption of the light emitting diode or other light source is reduced. Thus the object of power-saving is achieved, the cell is unnecessary to be updated frequently.

The present invention will be better understood and its numerous objects and advantages will become apparent to those skilled in the art by referencing to the following drawings in which:

DETAILED DESCRIPTION OF THE PREFERRED EMBODIMENT

Figure 1:
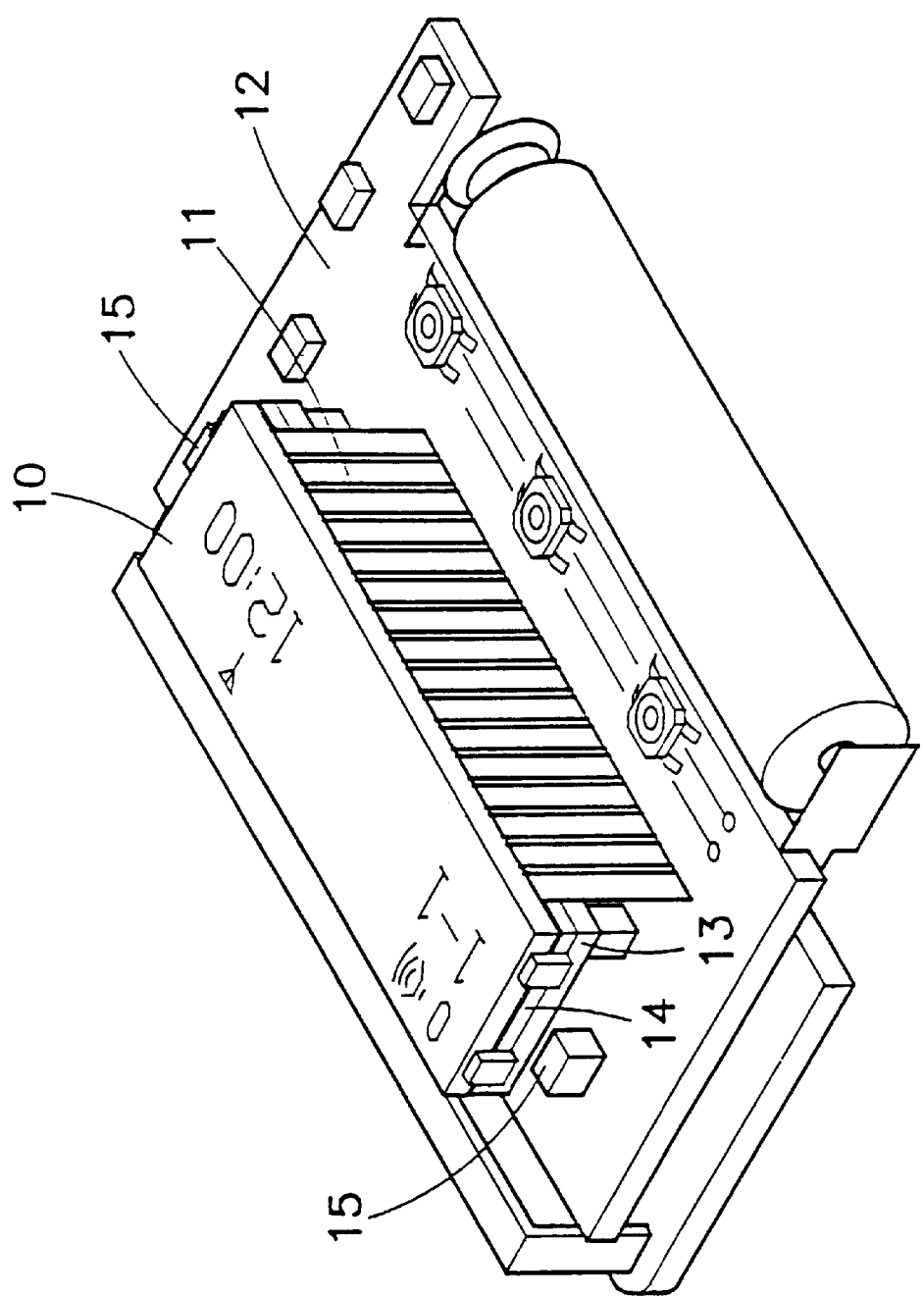
FIG. 1 is a perspective view of the embodiment of the present invention.
Figure 2:
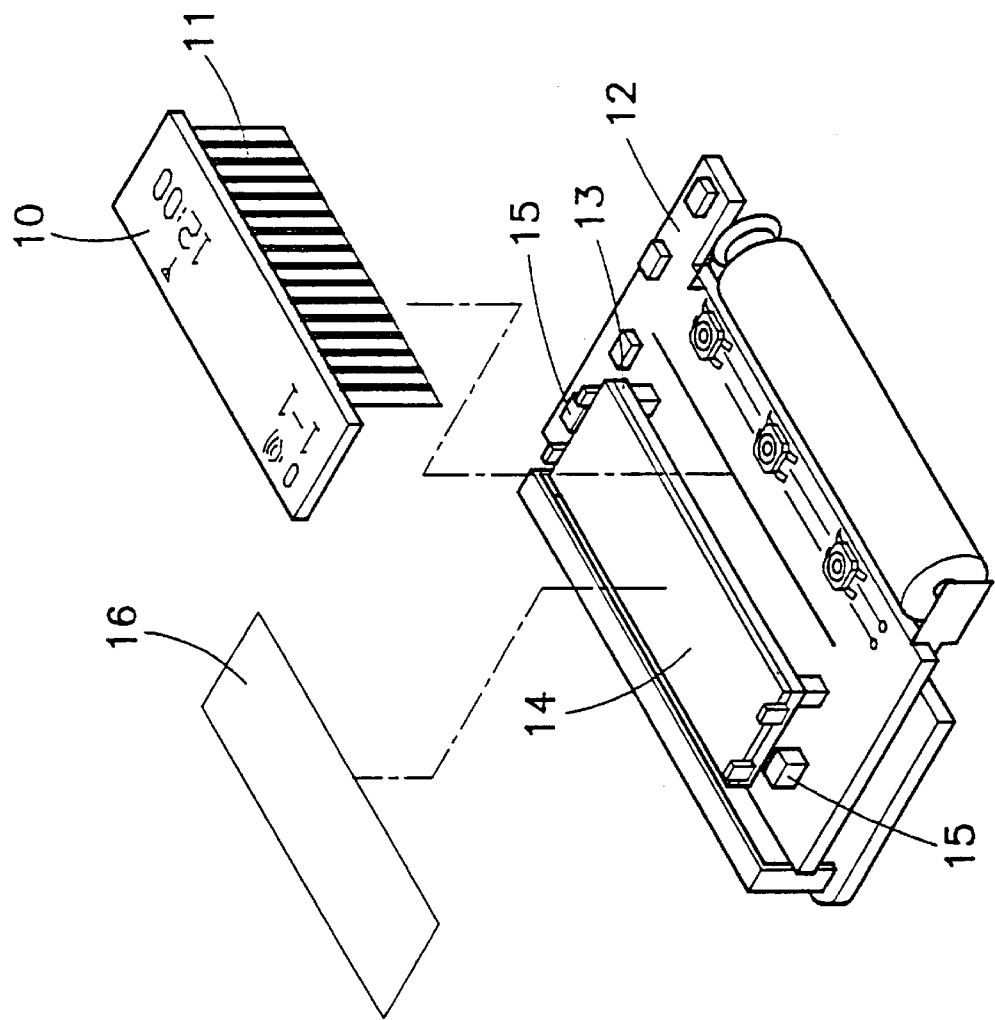
FIG. 2 is an exploded view of the embodiment in the present invention.
Figure 3:
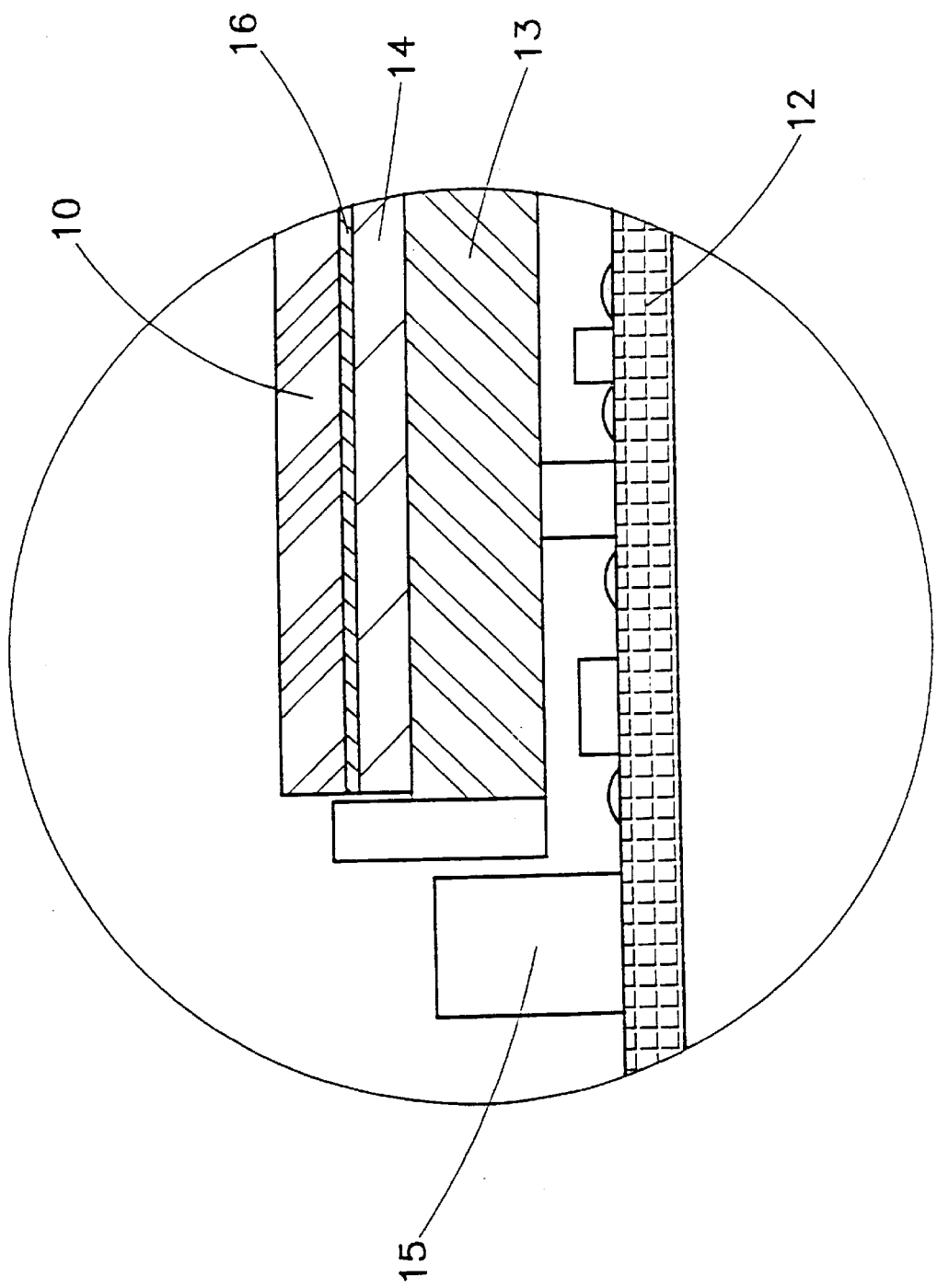
FIG. 3 is a partial cross sectional view of the embodiment in the present invention.

Referring to FIGS. 1, 2, and 3, the perspective, exploded, and partial cross sectional views of the embodiment of the present invention are disclosed, respectively, the LCD luminous structure of the present invention comprises a LCD liquid crystal displaying plate 10 which is connected with a bus 11 and a circuit board 12 so that the liquid crystal displaying plate 10 may present a expected function.

A light guiding plate 13 with proper width is installed below the liquid crystal displaying plate 10 and is fixed on a circuit 12. A dispersing plate 14 is matched above the light guiding plate 13. Two sides of the light guiding plate 13 are installed with light emitting diodes and other light source 15. When light is emitted from the light sources 15, the light will disperse through the light guiding plate 13, and then by the dispersing piece, the whole region will be illuminated. Thus the user may see the display of the liquid crystal displaying plate 10 under dark environment, such as at night. Since the aforementioned LCD structure is similar to that in the prior art and not within the range of the present invention, thus it will not be described herein.

In the present invention, the bottom of the liquid crystal displaying plate 10, i.e., the region between the liquid crystal displaying plate 10 and the dispersing plate 14, is installed with a luminous piece 16. This luminous piece can absorb light as it is illuminated by sunlight or bulb light, and can radiate light as it is at night or in dark environment with insufficient illumination. Therefore, in the night or other environments with bad illumination, the display message on the liquid crystal displaying plate may be clearly seen by a users. Since the installation of the luminous piece may provide another selected for the user, thus the power consumption of the light emitting diode, or other light source is reduced. Thus the object of power-saving is achieved, the cell is unnecessary to be updated frequently.

Figure 4:
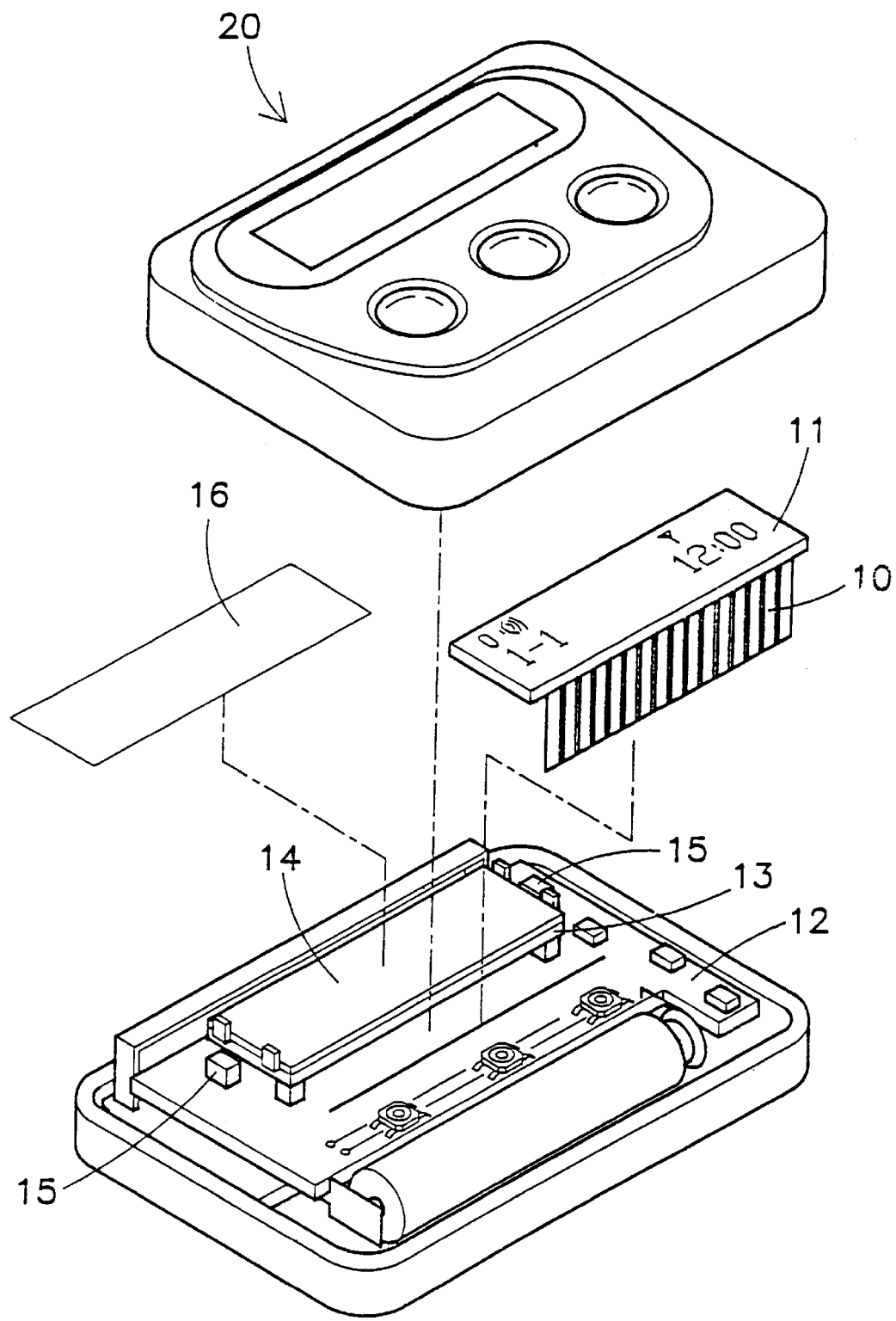
FIG. 4 is a perspective view shown that the present invention is used in a pager.

Referring now to FIG. 4, the perspective view of the embodiment in the present invention used in a pager is shown. The present invention may be installed on a pager 20, wireless phone and other products.

As aforementioned description, it is known the present invention has improved the performance of a prior art LCD. In the dark, the primary contacting piece may save power. Thus the present invention is a novel invention and is worthwhile to be awarded a patent.

Although the invention has been described in detail with reference only to a preferred embodiment, those skilled in the art will appreciate that various modifications can be made without departing from the invention. Accordingly, the invention is defined only by the following claims which are intended to embrace all equivalent thereof.

Description of the Numeral in Figures.

10 liquid crystal displaying plate
11 bus
12 circuit board
13 light guiding plate
14 dispersing piece
15 light source
16 luminous piece
20 pager

What is claimed is:

1. A luminous structure for liquid crystal displays, comprising:

a circuit board;

a liquid crystal display electrically coupled to said circuit board;

a luminous piece disposed beneath said liquid crystal display for absorbing ambient light impinging thereon and subsequently radiating light to function as a backlight for said liquid crystal display;

a dispersing plate disposed beneath said luminous piece;

a light guiding plate disposed beneath said dispersing plate and having an upper face disposed contiguous a lower face of said dispersing plate; and, at least one light source coupled to said circuit beard, said light source being selectably operable to provide light directed toward a side edge of said light guiding plate, said light guiding plate guiding incident light from said light source to be emitted from said upper face thereof for supplying light to said luminous piece and said liquid crystal display through said dispersing plate and thereby supplement radiated light from said luminous piece.

\* \* \* \* \*